J. A. Davis,
Cheese Vat.
No. 95662.  Patented Oct. 12. 1869.
Fig. 1.
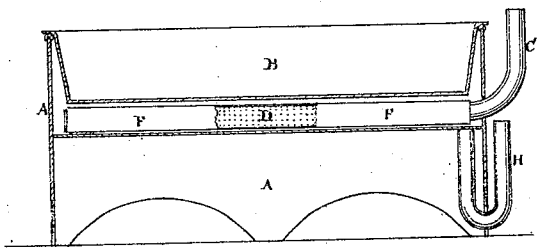
Fig. 2.    Fig. 3.
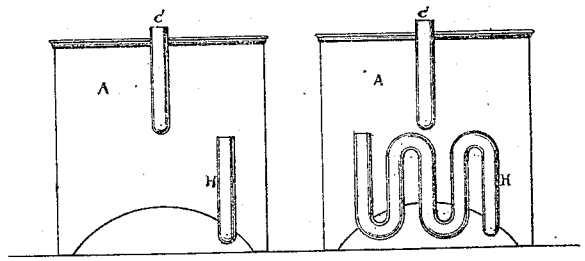
Fig. 4.    Fig. 5.
  
Fig. 6.
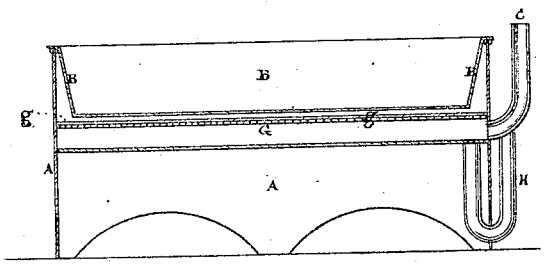
Witnesses.
J. F. Beale
F. W. Howard
Inventor,
Job A. Davis
by Crosby Halsted & Gould
his attorneys.

United States Patent Office.

JOB A. DAVIS, OF WATERTOWN, NEW YORK.

Letters Patent No. 95,662, dated October 12, 1869.

IMPROVEMENT IN STEAM CHEESE-VAT.

The Schedule referred to in these Letters Patent and making part of the same.

*To all whom it may concern:*

Be it known that I, JOB A. DAVIS, of Watertown, in the county of Jefferson, and State of New York, have invented a Steam Cheese-Vat; and I do hereby declare that the following, taken in connection with the drawings which accompany and form part of this specification, is a description of my invention, sufficient to enable those skilled in the art to practise it.

In the manufacture of cheese on a large scale, it is customary to use open vats or pans, capable of holding from, say, one hundred and twenty-five to five hundred and fifty gallons of milk. These are heated beneath until the proper temperature has been reached, and continued for the action of the rennet.

The usual mode of heating is to place these pans over, or, rather, in a vessel of hot water, or in water heated by steam-pipes passing through it, and various other modes of heating this water have been tried.

But in all the existing modes, there has been found a difficulty in imparting to the milk an even temperature throughout, and, as a consequence, where the vat is unduly heated at certain points, the coagulated milk clings to the vessel, causing much waste, impairing the quality of the cheese, gradually injuring the pan, and demanding much time and labor to keep the same clean and in good condition.

I avoid these difficulties and serious consequences by the employment of steam only as a heating-agent, and by causing it to pass through a fibrous, or textile, or equivalent medium, located between the steam-receiving chamber and the bottom of the milk-pan, to insure an equal diffusion of the steam, and prevent any direct current of steam coming in contact with the bottom of the pan.

My invention also consists in certain details of construction.

In the drawings—

Figure 1 represents a longitudinal section of my apparatus, with a portion of the tube-covering torn away;

Figure 2 is an end view, showing the steam-pipe and curved pipe for carrying off the water of condensation;

Figure 3, the same, with a modification of the last-named pipe;

Figures 4 and 5, cross views of two modes of employing perforated pipes; and

Figure 6, a modification, in longitudinal vertical section.

A is the body of my improved apparatus, and B the milk-pan or vessel, which is removable, and adapted to fit snugly, in the customary manner, and with proper packing, above that portion to be supplied by steam.

C is an inlet-tube for the steam, connecting directly with a finely-perforated metal tube or tubes, D, running the whole of the heating-chamber; this latter tube being surmounted with a shield or plate, E, for its whole length, but which is not as broad as the chamber, and which serves positively to interpose between the bottom of the pan and the numerous jets of hot steam issuing from the perforations, and arrest and break and diffuse them before they can reach the pan.

Still more effectually and practically to secure this end, I wrap this tube (or tubes, if more than one be used,) with one or more coverings or layers, F, of cloth, felt, knitted goods, or equivalent material, through which the steam must percolate before it can reach the bottom of the milk-pan.

Instead of the perforated tubes and shield-plate, a perforated diaphragm may be used, extending the whole length and breadth of the steam-chamber, as seen at G, the same being located above the inlet-pipe, and between it and the bottom of the milk-pan.

This should be covered, as above stated, with some textile or equivalent material, or it may be loosely overlaid with a covering, g, of any description, which will break and check the direct jets, and allow the steam to be steadily and evenly distributed.

When this textile or other material is made of sufficient thickness, it is evident that it will sufficiently control and check the steam, without resting upon a perforated support, any other support being then sufficient.

This even distribution prevents the coagulation of the milk at particular spots, and its clinging to the bottom of the pan.

H is the outlet-pipe for the water of condensation, and it is formed, it will be seen, as an inverted siphon, its outer mouth being slightly higher than its inner one.

By this means, resistance is offered to the pressure of the steam in the chamber, and this can be increased to any desired extent by simply continuing or multiplying the bends or sinuosities of this pipe, as shown at I.

I claim—

1. The process, herein described, of applying and controlling steam for heating the milk-pans of cheese-vats, the same consisting in passing it through a textile, fibrous, or equivalent material, placed between the steam-chamber and the bottom of the pan.

2. Also, in combination with a cheese-vat, a finely-perforated metal tube or diaphragm beneath the milk-pan, and covered with a textile or equivalent material, substantially as and for the purpose described.

3. Also, in combination with the steam-chamber of a cheese-making apparatus, an open-mouthed bent tube, substantially as and for the purposes described.

JOB A. DAVIS.

Witnesses:
J. F. BEALE,
JOHN J. HALSTED.